United States Patent
Shiraishi (10) Patent No.: US 10,703,033 B2
(45) Date of Patent: Jul. 7, 2020

(54) INJECTION MOLDING SYSTEM

(71) Applicant: FANUC Corporation, Yamanashi (JP)

(72) Inventor: Wataru Shiraishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 207 days.

(21) Appl. No.: 15/173,985

(22) Filed: Jun. 6, 2016

(65) Prior Publication Data

US 2016/0361855 A1 Dec. 15, 2016

(30) Foreign Application Priority Data

Jun. 11, 2015 (JP) .................................. 2015-118115

(51) Int. Cl.
| | | |
|---|---|---|
| *B29C 45/17* | (2006.01) | |
| *B29C 45/03* | (2006.01) | |
| *B29C 45/20* | (2006.01) | |
| *B29C 45/26* | (2006.01) | |
| *B29C 45/42* | (2006.01) | |
| *B29C 45/74* | (2006.01) | |
| *B29C 45/76* | (2006.01) | |
| *B29C 45/78* | (2006.01) | |
| *B29K 23/00* | (2006.01) | |

(52) U.S. Cl.
CPC .......... *B29C 45/1753* (2013.01); *B29C 45/03* (2013.01); *B29C 45/20* (2013.01); *B29C 45/26* (2013.01); *B29C 45/42* (2013.01); *B29C 45/74* (2013.01); *B29C 45/76* (2013.01); *B29C 45/78* (2013.01); *B29C 2945/7604* (2013.01); *B29C 2945/76036* (2013.01); *B29C 2945/76076* (2013.01); *B29K 2023/12* (2013.01)

(58) Field of Classification Search
CPC ..... B29C 45/1753; B29C 45/74; B29C 45/78; B29C 45/20; B29C 45/26; B29C 45/03; B29C 45/76; B29C 45/42; B29C 2945/76036; B29C 2945/7604; B29C 2945/76076; B29K 2023/12
USPC ......................................................... 425/135
See application file for complete search history.

(56) References Cited

U.S. PATENT DOCUMENTS 5,723,517 A * 3/1998 Campo ............... B01F 13/1055
137/93

FOREIGN PATENT DOCUMENTS

| CN | 102962207 A | 3/2013 | |
|---|---|---|---|
| JP | H0369330 A | 3/1991 | |
| JP | H0516175 A | 1/1993 | |
| JP | H0516175 B2 * | 3/1993 | ............. H01L 29/72 |

(Continued)

OTHER PUBLICATIONS

H. Yokoi et al., Journal of Materials Processing Technology, 130-131, 2002, 328-333 (Year: 2002).*

(Continued)

*Primary Examiner* — Michael N Orlando
*Assistant Examiner* — Christian Roldan
(74) *Attorney, Agent, or Firm* — Hauptman Ham, LLP (57) ABSTRACT

An injection molding system includes a sensor that detects a state of a purged molding material, and a purged material analysis unit that obtains a detection signal of the sensor and analyzes the purged molding material. Whether or not the purge operation is completed is determined based on the detection signal of the sensor so as to complete the purge operation. The purge operation is thus allowed to be completed with a minimum purge amount.

6 Claims, 4 Drawing Sheets

(56) References Cited

FOREIGN PATENT DOCUMENTS

| | | | |
|---|---|---|---|
| JP | H11277607 A | | 10/1999 |
| JP | 2012006297 A | | 1/2012 |
| JP | 2013-59997 A | | 4/2013 |
| JP | 2013059997 | * | 8/2015 |

OTHER PUBLICATIONS

Office Action in JP Application No. 2015-118115, dated May 16, 2017.
Office Action in CN Application No. 201610409177.6, dated Mar. 20, 2018, 12 pp.

* cited by examiner

INJECTION MOLDING SYSTEM

RELATED APPLICATIONS

The present application claims priority to Japanese Application Number 2015-118115, filed Jun. 11, 2015, the disclosure of which is hereby incorporated by reference herein in its entirety.

BACKGROUND OF THE INVENTION

1. Field of the Invention

The present invention relates to an injection molding system and in particular relates to an injection molding system that can perform an automatic purge operation for a molding material within a heating barrel of an injection molding machine to purge the molding material therefrom.

2. Description of the Related Art

An injection molding machine includes an injection unit and a mold clamping unit that are arranged on its machine base and opposed to each other. Closing and clamping of a mold is performed by the mold clamping unit. A molten resin is injected in the mold by an injection unit, then, a holding pressure is applied to the mold, and thus a molded article is shaped. The shaped molded article is ejected out of the mold using an ejection device while the mold is opened.

In an injection process of this type, the injection molding machine usually involves various types of molding materials while using one single machine configured for the injection molding. In such an environment where various types of molding materials are to be used, it is necessary to replace a molding material by any of the other ones and change the color of the molding material in use. In the course of the replacement of the molding material and the change in the color of the molding material, the injection molding process is stopped and a purge operation is performed in a state where an injection nozzle is moved away from the mold. The purge operation as used herein refers to an operation of replacing a molding material in the heating barrel by another molding material. The viscosity of the molding material remaining within the heating barrel may change due to temperature. In addition, its resistance to adhesion may vary on the metallic surfaces such as the heating barrel, an injection screw, and the injection nozzle. It will accordingly be appreciated that there is variation in the length of the time required for the purge operation and variation in a purge amount, i.e., an amount of a molding material to be purged.

As can be seen from the above, since the length of the time required for the purge operation as well as the purge amount vary depending on the molding materials, it is necessary to check whether or not the replacement of a molding material has been completed in a case where the purge operation is performed by an automatic purge feature incorporated in the injection molding machine or in any other relevant cases. Traditionally, the determination of whether or not the replacement of the molding material is completed draws on visual checking by an operator or the like. As a result, the operator has to be involved in a task or tasks associated with checking whether or not the replacement of the molding material is completed, which leads to increase in man-hours.

There is an existing method according to which a predetermined number of times of purge operation is performed instead of an operator checking the completion of the replacement of the molding material. As disclosed in Japanese Patent Laid-Open No. 11-277607, there is an existing method according to which the state of the resin replacement is determined by comparing an amount of resin that has been purged with a predetermined amount of resin that is needed for the resin to become stable or with a predetermined amount of resin needed until the resin that has to be replaced is completely replaced in the course of the resin replacement.

Also, Japanese Patent Laid-Open No. 3-069330 discloses techniques according to which a transparent window is provided in a nozzle; a reflected light, which results from the transparent window being irradiated with a light is taken in by a color discrimination element and then converted into a digital signal; the resultant digital signal is operated to obtain a color quantitative value; and whether or not the color change operation should be completed is determined by change in the color based on the color quantitative value.

Further, Japanese Patent Laid-Open No. 2012-006297 and Japanese Patent Laid-Open No. 5-016175 discloses techniques according to which an automatic purge operation for an injection molding machine is executed and a purged resin is automatically discarded.

The techniques disclosed in Japanese Patent Laid-Open No. 11-277607 as well as the state of the art techniques may involve a large amount of the purged molding material in order to reliably perform the replacement of the resin by another resin, which may lead to wasteful discharge of the molding material.

The technique disclosed in Japanese Patent Laid-Open No. 3-069330 needs to provide the transparent window in the nozzle and use a special system that includes the transparent window in the nozzle in order to determine the completion of the color change operation using the reflected light resulting from the transparent window irradiated with the light. Also, it may have to provide a transparent window that can withstand the high pressure at the time of the injection molding process. In addition, when the resin is adhered to the inner portion of the transparent window and degraded causing change in its color, it may become difficult to obtain the color information regarding the color of the resin inside of the nozzle even when the transparent window is irradiated with the light.

The techniques disclosed in Japanese Patent Laid-Open No. 2012-006297 and Japanese Patent Laid-Open No. 5-016175 requires a dedicated purged material disposal device for the automatic disposal of the purged resin.

SUMMARY OF THE INVENTION

In view of the above, an object of the present invention is to provide an injection molding system that is capable of completing a purge operation with a minimum purge amount.

The injection molding system of the present invention includes an injection molding machine including a mold, a heating barrel, a nozzle, and a control unit adapted to control the injection molding machine. The heating barrel and the nozzle are adapted to inject a molding material into the mold. The injection molding system is configured to automatically perform a purge operation for discharge and replacement of the molding material within the heating barrel. The injection molding system further includes a sensor configured to detect a state of the molding material purged by the purge operation; a movement unit configured to move the sensor; a purged material analysis unit configured to obtain a detection signal of the sensor and make an analysis of the purged molding material; and a purge completion determination unit configured to make a determination of whether or not the purge operation is completed on the basis of a result of the analysis by the purged material analysis unit and configured to output a result of the determination to the control unit of the injection molding machine. The purge operation is completed on the basis of the result of the determination by the purge completion determination unit.

By this feature, it is made possible to detect the completion of the purge operation without using a special device for the purge completion detection, provided in the injection device, and to complete the purge operation with the minimum purge amount.

It may also be contemplated that the sensor is an imaging device configured to capture an image of the material purged by the purge operation, and that the purged material analysis unit is configured to make an analysis of data of the image captured by the imaging device.

It may further be contemplated that at least one of hue, saturation, and brightness of the image data is used in the analysis.

By this feature, it is made possible to determine that the purge operation has been completed by virtue of grasping the change in the image data at the time of the resin being completely discharged relative to the image data of the resin flowing out in response to the start of the purge operation.

It may also be contemplated that the sensor is a temperature measurement sensor configured to measure a temperature of the material purged by the purge operation, and that the purged material analysis unit is configured to make an analysis of temperature measurement data of the temperature measured by the temperature measurement sensor.

It may further be contemplated that the purged material analysis unit is configured to make an analysis of whether or not the temperature measurement data has reached an allowable temperature range with reference to a set temperature when the set temperatures of the heating barrel and the nozzle of the injection molding machine have been changed, the set temperature being specified in advance.

By this feature, it is made possible to determine that the purge has been completed by grasping the change in the temperature measurement data after the resin having flowed down relative to the temperature measurement data of the resin flowing out as the result of the start of the purge operation.

The injection molding system may further include a setting automatic change unit having at least one determination criterion with respect to the result of the analysis by the purged material analysis unit and configured to automatically change a setting on the basis of the result of the determination based on the determination criterion, wherein the setting automatic change unit is configured to automatically change the setting during a time period from the start of the automatic purge operation to completion of the automatic purge operation.

By this feature, it is made possible to automatically change the settings on the basis of the result of the analysis of the purged material analysis unit by providing the setting automatic change unit and automatically changing the settings, which also makes it possible to reduce the amount of tasks to be done by the operator.

It may also be contemplated that the sensor is a gas detector configured to detect a gas generated from the purged molding material and the purged material analysis unit is configured to make an analysis of a gas component of the gas detected by the gas detector.

By this feature, it is made possible to determine that the purge has been completed by grasping the change in the gas component after the resin having flowed down or at the time of the types of the resins having been changed relative to the gas component of the gas generated as the result of the start of the purge operation.

It may also be contemplated that a molded article extraction unit is mountable on the movement unit, the molded article extraction unit being configured to take out a molded article that has been injection-molded from an inside of the mold.

The movement unit may be a robot.

According to this feature, since the sensor for detection of the state of the molding material and the molded article extraction unit are mounted on the same movement unit, two independent movement units do not need to be provided for the movement of the sensor and the molded article extraction unit, which makes it possible to simplify the configuration of the injection molding system.

The injection molding system may further include a purged material disposal unit and a purge operation time counting unit configured to measure a length of time of the purge operation, wherein the purged material disposal unit is configured to discard the purged material out of the injection molding machine when a predetermined time has elapsed after the start of the purge operation.

The injection molding system may further include a purged material disposal unit and a number-of-purges counting unit configured to count a number of times of the purge operation, wherein the purged material disposal unit is configured to discard the purged material out of the injection molding machine when a predetermined number of times of purge operation has been reached after the start of the purge operation, the predetermined number of times being specified in advance.

By this feature, it is made possible to prevent the purged material from being accumulated within the injection molding machine and adhered to the nozzle and the heating barrel. Also, it is made possible to reduce the man-hours associated with disposal of the purged material by an operator.

The purged material disposal unit may be detachably attached to the movement unit.

According to this feature, since the purged material disposal unit is detachably attached to the movement unit, it is made possible to detachably attach the molded article extraction unit, the sensor for analysis of the purged material, the purged material disposal unit, and other units in a replaceable manner using one single movement unit, and it is made possible to simplify the configuration of the injection molding system.

It may also be contemplated that an alarm is output when the purge operation is not completed as the result of the determination by the purge completion determination unit despite the predetermined length of time or the predetermined number of times of purge from the start of the preset purge having been reached.

By this feature, it is made possible to prevent excessive disposal or the like of the resin due to human errors such as a certain abnormality, failure to perform the resin replacement, and failure to stop feeding of the resin in the course of the resin replacement.

The present invention makes it possible to provide an injection molding system that is capable of completing the purge operation with the minimum purge amount.

BRIEF DESCRIPTION OF THE DRAWINGS

These and other objects and features of the present invention will become apparent from the following explanations of embodiments with reference to the attached drawings, in which.

DETAILED DESCRIPTION OF THE PREFERRED EMBODIMENTS

Figure 1:
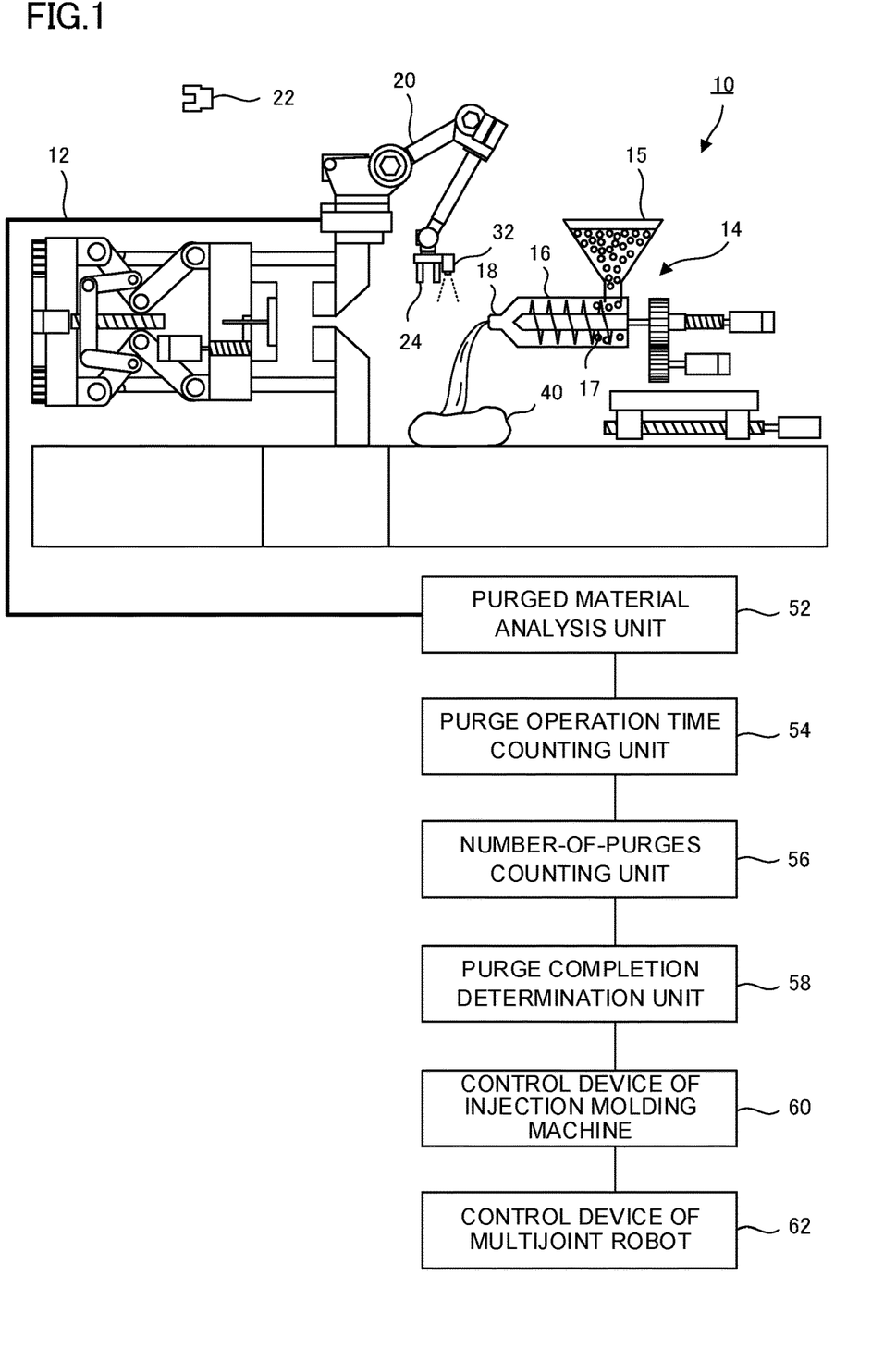
FIG. 1 is a diagram illustrating a configuration of an injection molding system according to one embodiment of the present invention.

Embodiments of the present invention are described hereinbelow with reference to the drawings. FIG. 1 is a diagram that illustrates a configuration of an injection molding system according to one embodiment of the present invention. The injection molding machine 10 includes a mold clamping device 12 and an injection device 14. Since traditionally known configurations may be used as the configuration of the mold clamping device 12, explanation thereof is omitted. The injection device 14 includes as its main components a hopper 15 adapted to store a resin; a heating barrel 16 to which the resin stored in the hopper 15 is fed; a screw 17 arranged inside of the heating barrel 16 and adapted to stir and convey the resin inside of the heating barrel 16; and a nozzle 18 provided at a distal end portion of the heating barrel 16 and adapted to eject the resin that is heated and melted within the heating barrel 16.

A multijoint robot 20 is mounted on the mold clamping device 12 of the injection molding machine 10. A purged material disposal hand 24 and a camera 32 serving as a sensor are attached to a distal end portion of the multijoint robot 20. Also, a molded article extraction hand 22 is configured to be attachable to the multijoint robot 20 in place of the purged material disposal hand 24 which is removed therefrom. Also, the reference sign 40 denotes a purged material that is purged from the nozzle 18 and accumulated on a machine base.

A purged material analysis unit 52, a purge operation time counting unit 54, a number-of-purges counting unit 56, a purge completion determination unit 58, a control device 60 of the injection molding machine, and a control device 62 of the multijoint robot are connected to the injection molding machine 10 and the multijoint robot 20.

When the molded article extraction hand 22 is attached to the multijoint robot 20, the multijoint robot 20 is moved to a location where the mold is opened, and performs the operation of taking out the molded article that has been shaped. Also, when the purged material 40 is discarded to the outside of the injection molding machine 10, the purged material disposal hand 24 is attached to the distal end portion of the multijoint robot 20 in place of the molded article extraction hand 22, and the purged material to be discharged is taken out of the injection molding machine 10 and discarded by the purged material disposal hand 24. Also, when an analysis of the resin that has been purged is performed by the camera 32, the multijoint robot 20 is moved to a position where the camera 32 can appropriately perform capturing of an image of the resin near the resin that is being purged from the nozzle 18 so as to perform the sensing.

Here, the following methods are typically used as the purge operation for the heating barrel 16 of the injection molding machine 10. The individual methods are used depending on the stages and purposes for which the purge operation is performed.

(1) Substantially Full and Complete Discharge of the Resin Residing Inside of the Heating Barrel 16

The purge operation is to be performed after the operation of the injection molding machine for one day has been completed or at any relevant timing. When the operation is completed while the resin remains within the heating barrel 16, a large amount of resin may be degraded within the heating barrel 16 at a cooling solidification process step or a subsequent heat-up process step.

(2) Replacement of the Resin by Another Resin Resistant to Degradation

In a case where the resin used in the injection molding process by the injection molding machine is likely to be degraded or in any similar cases, the previous resin is discharged by introducing a subsequent resin that is resistant to degradation. By making the resin resistant to degradation remain in the heating barrel 16, the resin is prevented from being degraded within the heating barrel 16.

(3) Replacement of the Resin by Another Resin that is Subsequently Used

When the injection molding process is continuously performed using a different resin material without stopping the operation of the injection molding machine, the resin to be subsequently used is fed into the heating barrel 16 for a predetermined period of time and thereby the previous resin is discharged.

In this embodiment, an analysis is performed by capturing, using the camera 32, an image of the molten resin that is discharged by the purge operation from the nozzle 18 and flows down therefrom. When the purge operation is started, the molten resin flows out of the nozzle 18 and the resin material that has been purged is accumulated in a purged material receiver provided below the nozzle 18.

Here, in a case where an operation is performed that fully discharge the resin within the heating barrel 16 as the purge operation, when the amount of resin within the heating barrel 16 is decreased and the amount of resin discharged by the purge operation is also decreased, then the movement of the resin stops in the image captured by the camera 32, as a result of which an image behind the resin as such will be captured. In this manner, it is made possible to determine that the purge operation has been completed by determining the stoppage of the movement of the resin by the purged material analysis unit 52 and the purge completion determination unit 58.

Also, it is also possible to make the analysis based on the differences in hue, saturation, and brightness of the resin. In this case, it is made possible to determine by the purged material analysis unit 52 and the purge completion determination unit 58 that the purge operation has been completed by virtue of reading data indicative of the hue, the saturation, and the brightness of the resin that flows out when the purge operation is started, and then capturing by the camera 32 the changes in the data of the hue, the saturation, and the brightness when the resin has been fully discharged.

Further, it is also possible to obtain the data regarding the hue, the saturation, and the brightness of the resin using a commercially available color-difference meter. In this case, the color-difference meter is attached to the multijoint robot 20 in place of the camera 32 so as to perform the measurement. The measured data is transmitted via a Bluetooth (registered trademark) connection or the like to a personal computer, and the data regarding the hue, the saturation, and the brightness may be obtained by the purged material analysis unit 52 via the personal computer. When a button operation is needed for data acquisition by the commercially available color-difference meter, automatic measurement is achieved by implementing a robot hand configuration that allows pressing of the button in an air-driven manner or the like manner.

In a case where the resin is replaced by another resin resistant to degradation as the purge operation, in a case where the resin is replaced by another resin for use in subsequent injection molding, it is difficult to make the determination based on the stoppage of the movement of the resin. In these cases, the hue, the saturation, and the brightness change due to changes in the color and types of the resin. In view of this, it is made possible to determine by the purged material analysis unit 52 and the purge completion determination unit 58 that the purge operation has been completed by virtue of setting reference values of the hue, the saturation, the brightness, and the like in advance, and detecting the fact that the values of the image captured by the camera 32 were changed exceeding the preset reference values and have subsequently become stable.

Figure 2:
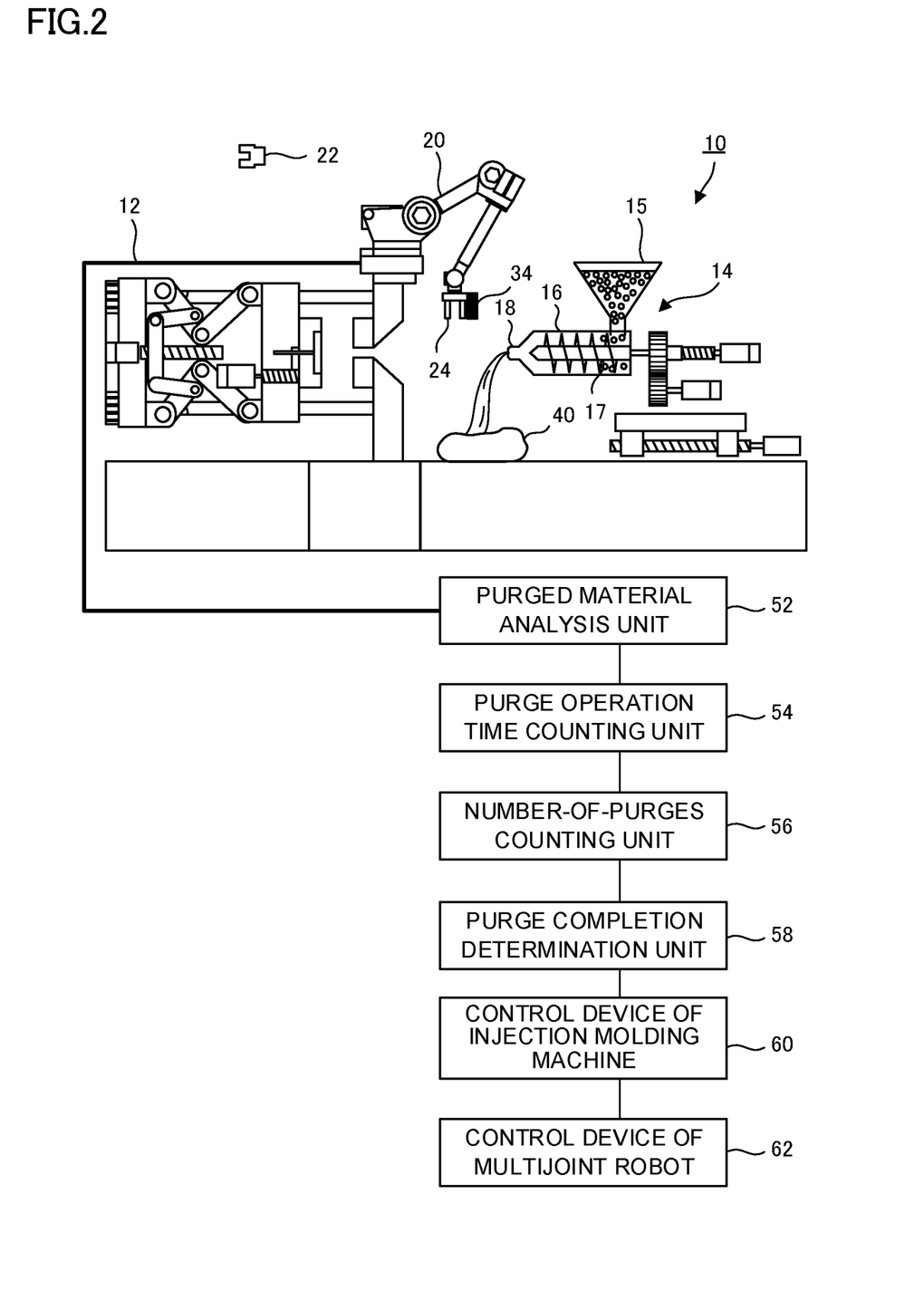
FIG. 2 is a diagram illustrating a configuration of an injection molding system according to another embodiment of the present invention.

FIG. 2 is a diagram that illustrates the configuration of the injection molding system of another embodiment. This embodiment differs from that illustrated in FIG. 1 in that the sensor of this embodiment is a temperature indicator 34, by which the camera 32 of the embodiment is replaced.

In this embodiment, the analysis is performed by measuring by the temperature indicator 34 a temperature of the molten resin that is discharged from the nozzle 18 and flows down therefrom by the purge operation. As the temperature indicator 34, a non-contact type temperature indicator may be used, or a temperature indicator may be used that is brought into direct contact with the resin that is flowing down and thereby measures the temperature thereof.

When the purge operation is started, the molten resin flows out of the nozzle 18 and the purged resin material is accumulated in the purged material receiver provided below the nozzle 18. When the purge operation is started, it can be determined that the purge operation has been started based on the rise in the temperature measured by the temperature indicator 34 due to the resin which is flowing down.

Here, in a case where an operation is performed that fully discharges the resin within the heating barrel 16 as the purge operation, when the amount of resin within the heating barrel 16 is decreased, then the length of time during which the resin is heated within the heating barrel 16 is also decreased, so that the temperature of the resin is decreased. When the resin is fully discharged and there is no more resin that flows down, in particular in a case where the non-contact type temperature indicator is used, a temperature of another member behind the resin as such will be measured, as a result of which the temperature measured by the temperature indicator 34 is significantly decreased. It can be determined that the purge operation has been completed by determining this fact by the purged material analysis unit 52 and the purge completion determination unit 58.

Also, in a case where the resin is replaced by another resin resistant to degradation or in a case where the resin is replaced by another subsequently used resin as the purge operation, the appropriate temperature at the time of the injection molding process varies in normal cases depending on the types of the resins. Since the set temperatures are different from each other corresponding to the types of the resins, the temperature measured by the temperature indicator 34 changes due to the difference in the set temperatures in the course of the replacement of one resin by another resin. As a result, it can be determined by the purged material analysis unit 52 and the purge completion determination unit 58 that the purge operation has been completed by virtue of grasping the fact that the temperature measured by the temperature indicator 34 comes to fall within an allowable temperature range with reference to the preset set temperature and further the temperature becomes stable.

Figure 3:
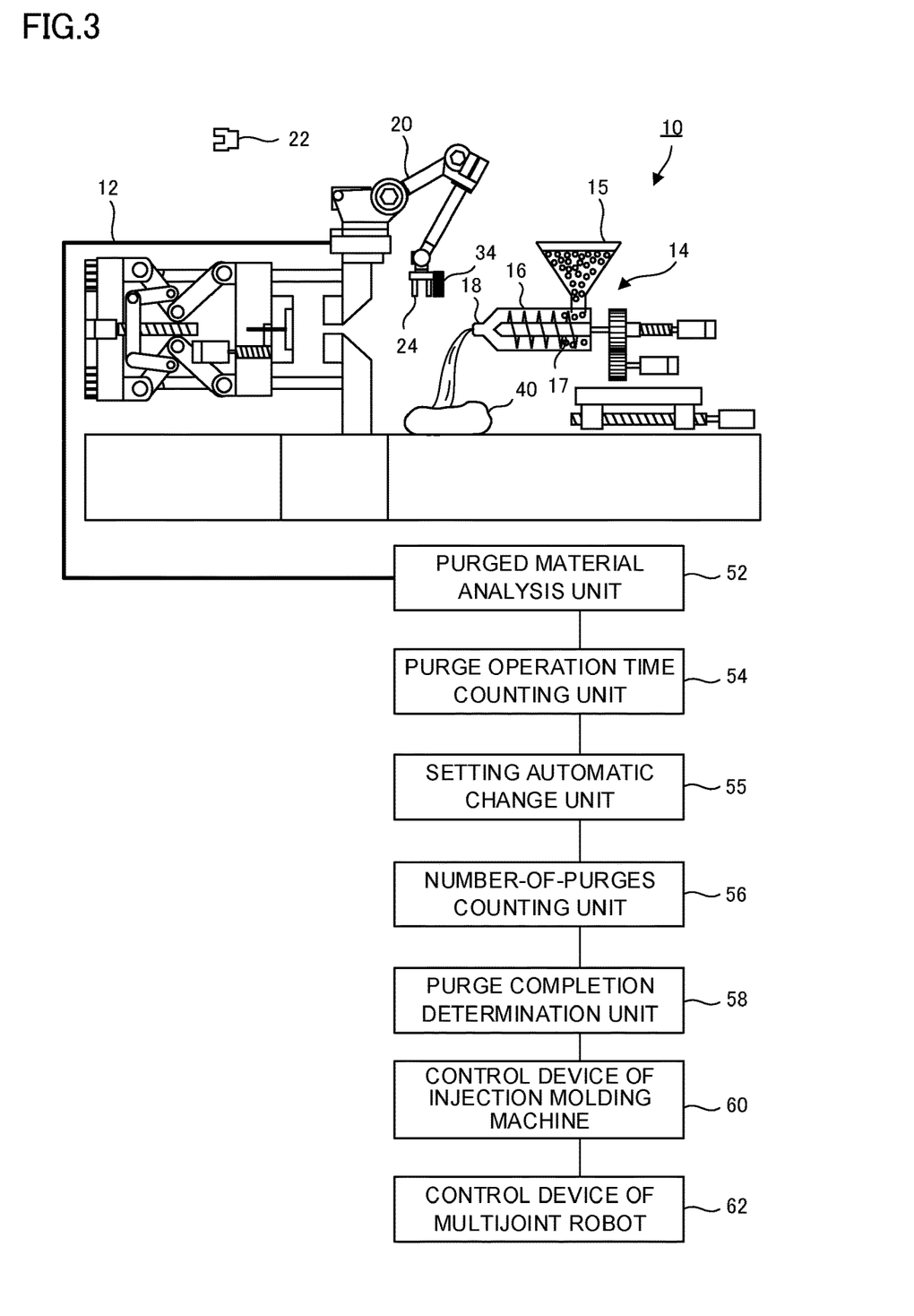
FIG. 3 is a diagram illustrating a configuration of an injection molding system according to still another embodiment of the present invention.

FIG. 3 is a diagram that illustrates the configuration of the injection molding system according to still another embodiment. In this embodiment, there is provided a setting automatic change unit so as to realize changes to the settings.

In the context of this embodiment, an example is illustrated where, as the resin, a polycarbonate resin with its set temperature of 300° C. is to be replaced by a polypropylene resin with its set temperature of 200° C. As the temperature indicator 34, a non-contact type temperature indicator is used, the position of the multijoint robot 20 is specified, and the measurement of the temperature is performed on the assumption that the region extending between the tip of the nozzle 18 and the purge receiver in which the purged resin material is accumulated is the measurement region.

In this embodiment, there is further provided a setting automatic change unit 55, settings for which are made such that the setting automatic change unit 55 changes the settings on the basis of the following determination criteria.

First determination criterion: it is determined whether or not the measured temperature becomes equal to or lower than 100° C. after the start of the automatic purge operation. When the measured temperature is equal to or lower than 100° C., the polycarbonate resin that is the previous resin is regarded as having been discharged, and the automatic feed of the polypropylene resin that is the subsequent resin is started.

Second determination criterion: it is determined whether or not the measured temperature becomes equal to or higher than 290° C. following the first setting change using the first determination criterion. When the measured temperature has become equal to or higher than 290° C., then the set temperatures of all the heaters are changed to 280° C.

Third determination criterion: it is determined whether or not the measured temperature becomes equal to or lower than 290° C. following the second setting change using the second determination criterion. When the measured temperature has become equal to or lower than 290° C., then the set temperatures of all the heaters are changed to 210° C. and the automatic purge operation is temporarily stopped.

Fourth determination criterion: it is determined whether or not the measured temperature becomes equal to or lower than 220° C. following the third setting change using the third determination criterion. When the measured temperature has become equal to or lower than 220° C., then the set temperatures of all the heaters are changed to 200° C. which is the molding temperature of the polypropylene resin that is the subsequent resin and the automatic purge operation is resumed.

Also, a hopper loader adapted to feed a polypropylene resin is attached to the heating barrel 16 prior to the start of the automatic purge operation such that the automatic feeding of the polypropylene resin can be started on the basis of the signal output from the setting automatic change unit 55.

Next, the process steps of the automatic purge operation according to this embodiment are described below.

(1) The automatic purge operation is started while the set temperature of 300° C. is maintained.

(2) When the polycarbonate within the heating barrel 16 is discharged and ceases to flow out of the tip of the nozzle 18, then the temperature of the other member behind the polycarbonate is measured as the temperature measured by the non-contact type temperature indicator instead of the temperature of the polycarbonate resin, and the measured temperature is rapidly decreased. When the measured temperature becomes equal to or lower than 100° C., feeding of the polypropylene to the heating barrel is started on the basis of the first determination criterion of the setting automatic change unit 55.

(3) When the polypropylene resin is loaded into the heating barrel 16 and flows out of the tip of the nozzle, a temperature equal to or higher than 290° C. is measured as the measured temperature of the temperature indicator 34. In response to this, the set temperatures of all the heaters are changed to 280° C. on the basis of the second determination criterion of the setting automatic change unit 55.

(4) When the measured temperature of the temperature indicator 34 becomes equal to or lower than 290° C., the set temperatures of all the heaters are changed to 210° C. on the basis of the third determination criterion, and the automatic purge operation is temporarily stopped. Since the temperature change takes time, unnecessary purge of the molding material is prevented by the temporary stoppage of the automatic purge operation. It may also be contemplated that, when the resin is replaced by a molding material whose thermal stability is low as the subsequent resin, the automatic purge operation may be performed at a low speed or the automatic purge operation may be intermittently performed during the process (4) in order that the resin does not remain to reside.

(5) When the measured temperature of the temperature indicator 34 becomes equal to or lower than 220° C., the set temperatures of all the heaters are changed to 200° C. which is the molding temperature of the polypropylene resin on the basis of the fourth determination criterion and the automatic purge operation is resumed.

(6) When the measured temperature of the temperature indicator 34 has reached 210° C., the purge completion determination unit 58 is made to determine that the purge operation has been completed and stop the purge operation.

It should be noted that, when the mold is replaced by an automatic mold replacement device or the like during this process of the automatic purge, it is made possible to immediately start the injection molding process with the polypropylene resin.

It may also be contemplated that, in replacement of the molding material, one or two types of agents specifically for the purge may be made to flow and then the previous resin is replaced by the subsequent molding material in order to completely discharge the previous molding material. In this case, since the color varies depending on the materials, the setting automatic change unit may be used such that the image captured by the camera 32 of the first embodiment is used and the set temperature change based on the color change is performed.

Figure 4:
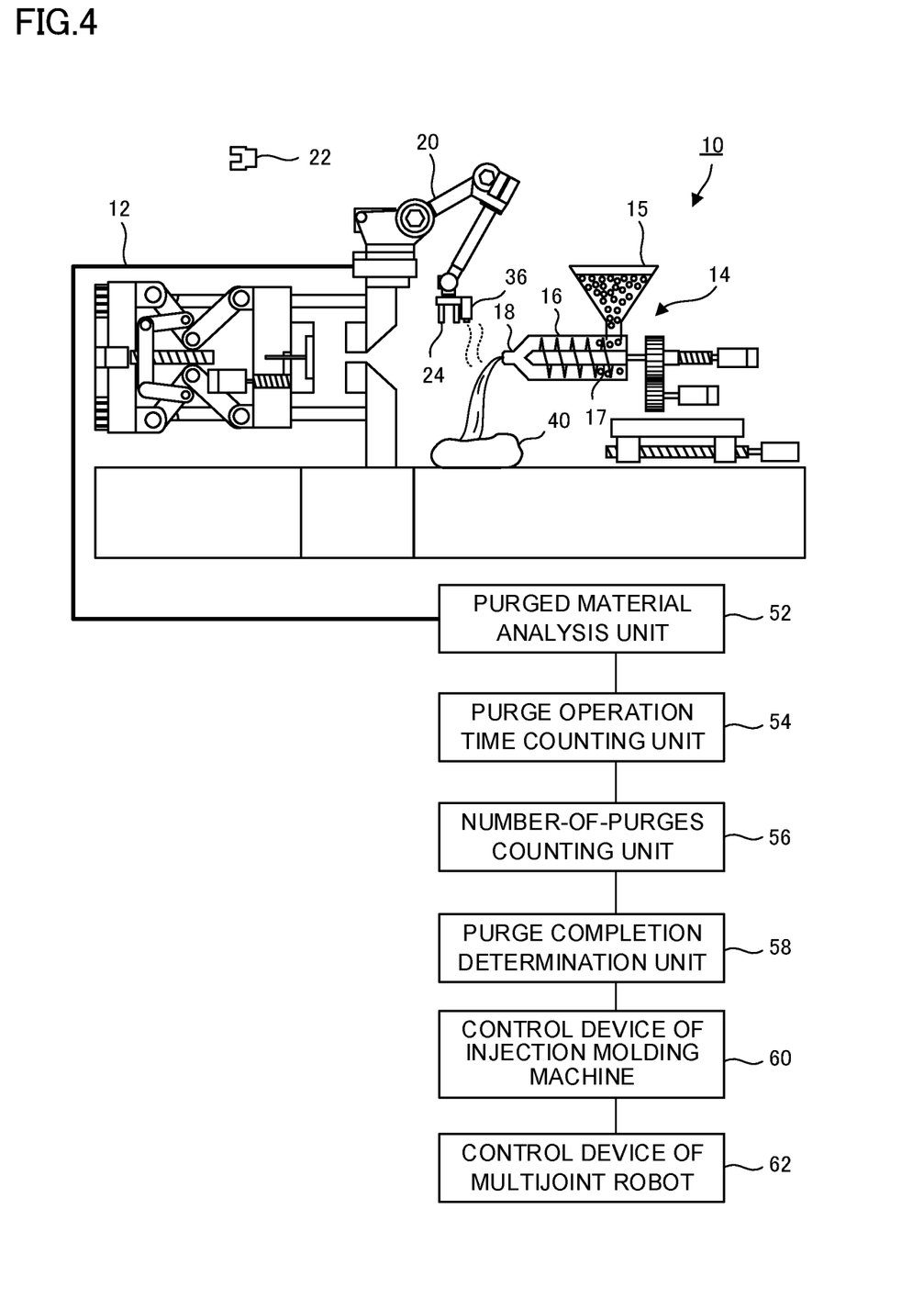
FIG. 4 is a diagram illustrating a configuration of an injection molding system according to yet another embodiment of the present invention.

FIG. 4 is a diagram that illustrates the configuration of the injection molding system according to yet another embodiment of the present invention. This embodiment differs from that illustrated in FIG. 1 in that the sensor of this embodiment is a gas sensor 36, by which the camera 32 of the embodiment of FIG. 1 is replaced.

In this embodiment, an analysis of a gas component or components is performed by the gas sensor 36 detecting, above the nozzle 18, a gas generated from the molten resin that is discharged from the nozzle 18 by the purge operation and flows down therefrom. As the gas sensor 36, an infrared gas analyzer, laser gas analyzer, or any other appropriate gas analyzer may be used. Although various gases may be generated from resins, the analysis of the gases such as HCl, $NH_3$, $O_2$, CO, $CO_2$, $CH_4$, $NO_x$, and $SO_2$ that are generated from molten resins can be performed by using any one of these gas analyzers.

This embodiment is effective in particular in a case where the resin is replaced by another resin resistant to degradation or by another resin to be used in the subsequent injection molding as the purge operation. When the types of the resins that flow out are changed due to the replacement of the resins, the gas components of the gas generated from the resin change, so that it is made possible to determine by the purged material analysis unit 52 and the purge completion determination unit 58 that the purge operation has been completed by virtue of grasping the fact that the gas components after the change have become stable.

Also, in these respective embodiments, when the camera 32, the temperature indicator 34, the gas sensor 36, and the purged material analysis unit 52, which serve as the sensor, are integrated into an integrated sensor, it is made possible to perform the sensing by holding the integrated sensor by the multijoint robot 20. This feature makes it possible to more readily define the configuration of the injection molding system. Further, when the output mode of the data is of a wireless type, no cable needs to be arranged. When the sensor is moved to the measurement position, it is made possible to eliminate the need to worry about the high-temperature section of the injection molding machine 10 being brought into contact with the cable. Also, in the programming of the operation of the multijoint robot 20, the need to take into account the contact with the cable will be eliminated.

In each embodiment, it may also be contemplated that the elapsed time after the start of the purge operation is measured by the purge operation time counting unit 54, and the purged material accumulated on the machine base of the injection molding machine 10 below the nozzle 18 is discarded to the outside of the injection molding machine 10 by the purged material disposal hand 24 attached to the multijoint robot 20 every time a preset predetermined time elapses. This configuration makes it possible to prevent the purged material from being accumulated on the machine base of the injection molding machine 10 below the nozzle 18 and being adhered to the nozzle 18 and the heating barrel 16. Also, it is made possible to eliminate the operation process of discarding the purged material, which has traditionally been performed by an operator who may suffer a burn in the course of the operation.

In addition, in place of the measurement of the elapsed time by the purge operation time counting unit 54, it is also possible to count the number of times of purge after the start of the purge operation by the number-of-purges counting unit 56. In this case, the purged material is discarded to the outside of the injection molding machine 10 by the purged material disposal hand 24 attached to the multijoint robot 20 every time a preset predetermined number of times is reached. By this feature, it is made possible to prevent the purged material from being accumulated on the machine base of the injection molding machine 10 below the nozzle 18 and being adhered to the nozzle 18 and the heating barrel 16. Also, it is made possible to eliminate the operation process of discarding the purged material, which has traditionally been performed by an operator who may suffer a burn in the course of the operation. In either case, a configuration according to which the molded article extraction hand 22 and the purged material disposal hand 24 are in a replaceable manner attached to the multijoint robot 20 makes it possible to take out the molded article by one single multijoint robot 20 and perform the purged material analysis and the purged material disposal without the need of providing multiple robots.

The purge operation time counting unit 54 and the number-of-purges counting unit 56 can be used according to another mode of utilization. In a case where it has not been determined that the purge is completed by the camera 32, the temperature indicator 34, the gas sensor 36, and the purged material analysis unit 52 which serve as the sensor in the respective embodiments even when the elapsed time after the start of the purge operation by the purge operation time counting unit 54 has reached a preset predetermined length of time, or the count result of the number of times of purge after the start of the purge operation by the number-of-purges counting unit 56 has reached the preset predetermined number of times, an alarm may be output to notify this fact to the operator. By this configuration, it is made possible to prevent excessive disposal or the like of the resin due to human errors such as a certain abnormality occurring in the injection molding machine 10, failure to perform the resin replacement, and failure to stop feeding of the resin in the course of the resin replacement.

In these embodiments, although the configuration is described in which the molded article extraction hand 22 and the purged material disposal hand 24 are attached in a replaceable manner to the distal end portion of the one single multijoint robot 20, this configuration is not essential. It is also possible to attach the molded article extraction hand 22 and the purged material disposal hand 24 respectively to two different robots for their individual operations.

Also, in these embodiments, the descriptions thereof are presented on the assumption that the configuration includes the purge operation time counting unit 54 and the number-of-purges counting unit 56. However, it is not essential to measure or count the elapsed time after the start of the purge operation and the number of times of purge after the start of the purge operation. Even when these values are not measured or counted, these embodiments can be implemented. In a case where the measurement or counting thereof is not performed, the purge operation time counting unit 54 and the number-of-purges counting unit 56 do not need to be provided.

The invention claimed is:

1. An injection molding system, comprising:
an injection molding machine including
a mold clamping device configured to clamp a mold,
an injection device including a heating barrel and a nozzle, and
a control unit adapted to control the injection molding machine, the heating barrel and the nozzle being adapted to inject a molding material into the mold, wherein the injection molding system is configured to automatically perform a purge operation for discharge and replacement of the molding material within the heating barrel;
a sensor configured to detect a state of the molding material purged by the purge operation;
a movement unit mounted to the mold clamping device and configured to move the sensor;
a purged material analysis unit configured to obtain a detection signal of the sensor and make an analysis of the purged molding material; and
a purge completion determination unit configured to make a determination of whether or not the purge operation is completed on the basis of a result of the analysis by the purged material analysis unit and configured to output a result of the determination to the control unit of the injection molding machine, the injection molding system being configured to complete the purge operation on the basis of the result of the determination by the purge completion determination unit,
wherein
the sensor is an imaging device configured to capture
a first image of the material that flows out from the nozzle when the purge operation is started, and
a second image of the material purged when the purge operation is performed after the purge operation is started,
the purged material analysis unit is configured to make an analysis of image data of the first and second images captured by the imaging device,
the purge completion determination unit is configured to make the determination of whether or not the purge operation is completed on the basis of
a determination of whether or not the image data of the second image exceed preset reference values and subsequently become stable, and
at least one of hue, saturation, and brightness of the image data of the first and second images is used in the analysis.

2. The injection molding system according to claim 1, further comprising a setting automatic change unit having at least one determination criterion with respect to the result of the analysis by the purged material analysis unit and configured to automatically change a setting on the basis of the result of the determination based on the determination criterion,
wherein the setting automatic change unit is configured to automatically change the setting during a time period from the start of the automatic purge operation to completion of the automatic purge operation.

3. The injection molding system according to claim 1, further comprising a molded article extraction unit mountable on the movement unit, the molded article extraction unit being configured to take out a molded article that has been injection-molded from an inside of the mold.

4. The injection molding system according to claim 1, wherein the movement unit is a robot.

5. The injection molding system according to claim 1, further comprising a purged material disposal unit and a number-of-purges counting unit configured to count a number of times of the purge operation,
wherein the purged material disposal unit is configured to discard the purged material out of the injection molding machine when a preset predetermined number of times of purge has been reached after the start of the purge operation.

6. The injection molding system according to claim 1, wherein an alarm is output when the purge operation is not completed as the result of the determination by the purge completion determination unit despite the predetermined length of time or the predetermined number of times of the purge operation from the start of the purge operation having been reached, the predetermined length of time and the predetermined number of times of the purge operation being specified in advance.

\* \* \* \* \*